United States Patent
Bench et al.

(10) Patent No.: US 11,589,318 B1
(45) Date of Patent: Feb. 21, 2023

(54) ABRUPT INTERFERENCE MITIGATION

(71) Applicant: L3Harris Technologies, Inc., Melbourne, FL (US)

(72) Inventors: Jeffrey B. Bench, Lehi, UT (US); Brian J. Thorp, Sandy, UT (US); Rhett B. McCarthy, Riverton, UT (US); Scott A. Carey, Alpine, UT (US); Brent A. Kenney, Bountiful, UT (US); Phillip Hunt, Syracuse, UT (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 0 days.

(21) Appl. No.: 17/387,705

(22) Filed: Jul. 28, 2021

(51) Int. Cl.
*H04B 15/00* (2006.01)
*H04W 52/24* (2009.01)
*H04B 1/525* (2015.01)
*H04B 17/336* (2015.01)

(52) U.S. Cl.
CPC .......... *H04W 52/243* (2013.01); *H04B 1/525* (2013.01); *H04B 17/336* (2015.01)

(58) Field of Classification Search
CPC . H04W 52/243; H04W 52/241; H04W 52/16; H04W 72/085; H04W 72/0473; H04W 52/245; H04W 16/14; H04W 52/24; H04B 1/525; H04B 17/336; H04B 1/69; H04B 1/40; H04B 2203/5425
See application file for complete search history.

(56) References Cited

U.S. PATENT DOCUMENTS

| | | | |
|---|---|---|---|
| 6,229,998 B1 * | 5/2001 | Hamdy | H04B 1/7102 455/226.1 |
| 7,072,681 B2 * | 7/2006 | Hamabe | H04W 52/40 455/127.1 |
| 7,463,592 B2 | 12/2008 | Poncini et al. | |
| 9,577,687 B2 * | 2/2017 | Kpodzo | H04K 3/228 |

(Continued)

FOREIGN PATENT DOCUMENTS

WO 2018/217724 A1 11/2018

OTHER PUBLICATIONS

Chowdhury K.R., et al., "Cognitive Wireless Mesh Networks with Dynamic Spectrum Access," IEEE Journal on Selected Areas in Communications, vol. 26, No. 1, Jan. 2008, pp. 168-181.

(Continued)

*Primary Examiner* — Nhan T Le
(74) *Attorney, Agent, or Firm* — Workman Nydegger

(57) ABSTRACT

Providing signal-to-noise ratio information to a local transmitter node. A method includes receiving data in a signal transmitted on a data channel from the local transmitter node. A first signal-to-total-power ratio for the signal assuming no jamming of the signal is occurring is computed. A second signal-to-total-power ratio for the signal with factors included assuming jamming is occurring is computed. The first signal-to-total-power ratio to the second signal-to-total-power ratio are compared to determine if they differ by a predetermined amount. The method includes determining that the predetermined amount is exceeded, and as a result, a jammed signal-to-noise ratio is computed assuming jamming is occurring. The jammed signal-to-noise ratio is sent to the local transmitter node to allow the local transmitter to respond to the jammed signal-to-noise ratio.

20 Claims, 4 Drawing Sheets

(56) References Cited

U.S. PATENT DOCUMENTS

| | | | |
|---|---|---|---|
| 10,181,972 B1 | 1/2019 | Giallorenzi et al. | |
| 10,455,457 B2 * | 10/2019 | Sadek | H04L 5/0051 |
| 10,868,609 B1 * | 12/2020 | Kossin | H04B 7/10 |
| 2006/0140251 A1 | 6/2006 | Brown et al. | |
| 2020/0412439 A1 | 12/2020 | Kossin et al. | |

OTHER PUBLICATIONS

European Search Report received for EP Patent Application No. 22183998.8, dated Dec. 13, 2022, 8 pages.

* cited by examiner

ABRUPT INTERFERENCE MITIGATION

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Some computing systems communicate using ad-hoc mesh networks, which are typically wireless decentralized networks where the various nodes in the mesh network identify neighbor nodes to add to the network. One example of such a network is a code division multiple access (CDMA) mobile ad-hoc network (MANET).

In some systems, nodes have transmission agility as a means to avoid intentional or un-intentional interference. Transmission agility may be manifest in several ways to counteract jamming, including, for example, a node's ability to: adjust power of transmission signals (where increasing transmission power can counteract jamming by increasing a target signal-to-noise ratio), adjust the data rate at which signals are transmitted (where decreasing bit rate can counteract jamming by increasing the signal-to-noise ratio), and/or changing center frequencies to avoid jammers in a particular frequency bandwidth.

A local transmitter node can determine that counteractions need to be performed based on information received from a remote receiver node to which it is sending data. For example, the remote receiver node may provide information to the local transmitter node indicating the signal-to-noise ratio at which a signal is received from the local transmitter node. Alternatively, or additionally, the remote receiver node may provide information indicating a power spectrum for signals received at the remote receiver node. The local transmitter node can use this information to determine if counteractive measures are required.

When interference is abruptly presented from an adversarial jammer (or due to other reasons such as unintended, but nonetheless targeted frequency interference) at the receiver node at a sufficient power, the intended signal from the local transmitter node to the remote receiver node will be lost. In a frequency-agile system, the local transmitter node of the intended signal can recover by shifting to a new frequency. However, without sufficient mitigation for the abrupt jammer, the response could be significantly delayed and/or misinformed.

If a signal-to-noise ratio value (often expressed as $E_b/N_0$, where $E_b$ is the energy per bit, and $N_0$ is the noise power spectral density, which is noise power at the remote receiver node divided by a spread bandwidth) is being estimated when the abrupt interference is applied, then it will be far off from the actual value. Furthermore, the inaccuracy of the signal-to-noise ratio estimate hinders (or incapacitates) corrections that can be made using power and rate control at the local transmitter node.

Further, signal spectral data at the remote receiver node is measured independently from the signal-to-noise ratio measurements. Signal-to-noise ratio measurements are unavailable as the remote receiver node loses timing and/or phase lock. If a pre-interference signal-to-noise ratio (in time) is paired with the new spectral information containing interference, then the local transmitter node will receive incorrect feedback with respect to signal-to-noise ratio and spectral information. This will prevent the local transmitter node from accurately estimating power and rate information.

Previously, a local transmitter node would respond to the jamming using power and rate control. For example, the transmitter node would perform some combination of increased power and decreased signal rate. In some cases, this can be successful in adjusting to the jamming, but this becomes problematic if the jamming is (1) abrupt and (2) very strong.

That is, previously, the remote receiver node provided the most recent spectrum along with the most recent signal-to-noise ratio to the local transmitter node to aid in power control. However, given abrupt jamming situations, there can be a drastic mismatch between spectral and signal-to-noise ratio estimates. The frequency agility response in these situations is often slow and sometimes non-responsive.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced at a remote receiver node in a network. The method includes acts for providing signal-to-noise ratio information to a local transmitter node. The method includes receiving data in a signal transmitted on a data channel from the local transmitter node. A first signal-to-total-power ratio for the signal assuming no jamming of the signal is occurring is computed. A second signal-to-total-power ratio for the signal with factors included, assuming jamming is occurring, is computed. The first signal-to-total-power ratio and the second signal-to-total-power ratio are compared to determine if they differ by at least a predetermined amount. The method includes determining that the predetermined amount is exceeded, and as a result, a jammed signal-to-noise ratio is computed, assuming jamming is occurring, replacing a current calculated signal-to-noise ratio. The jammed signal-to-noise ratio is sent to the local transmitter node to allow the local transmitter to respond to the jammed signal-to-noise ratio.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
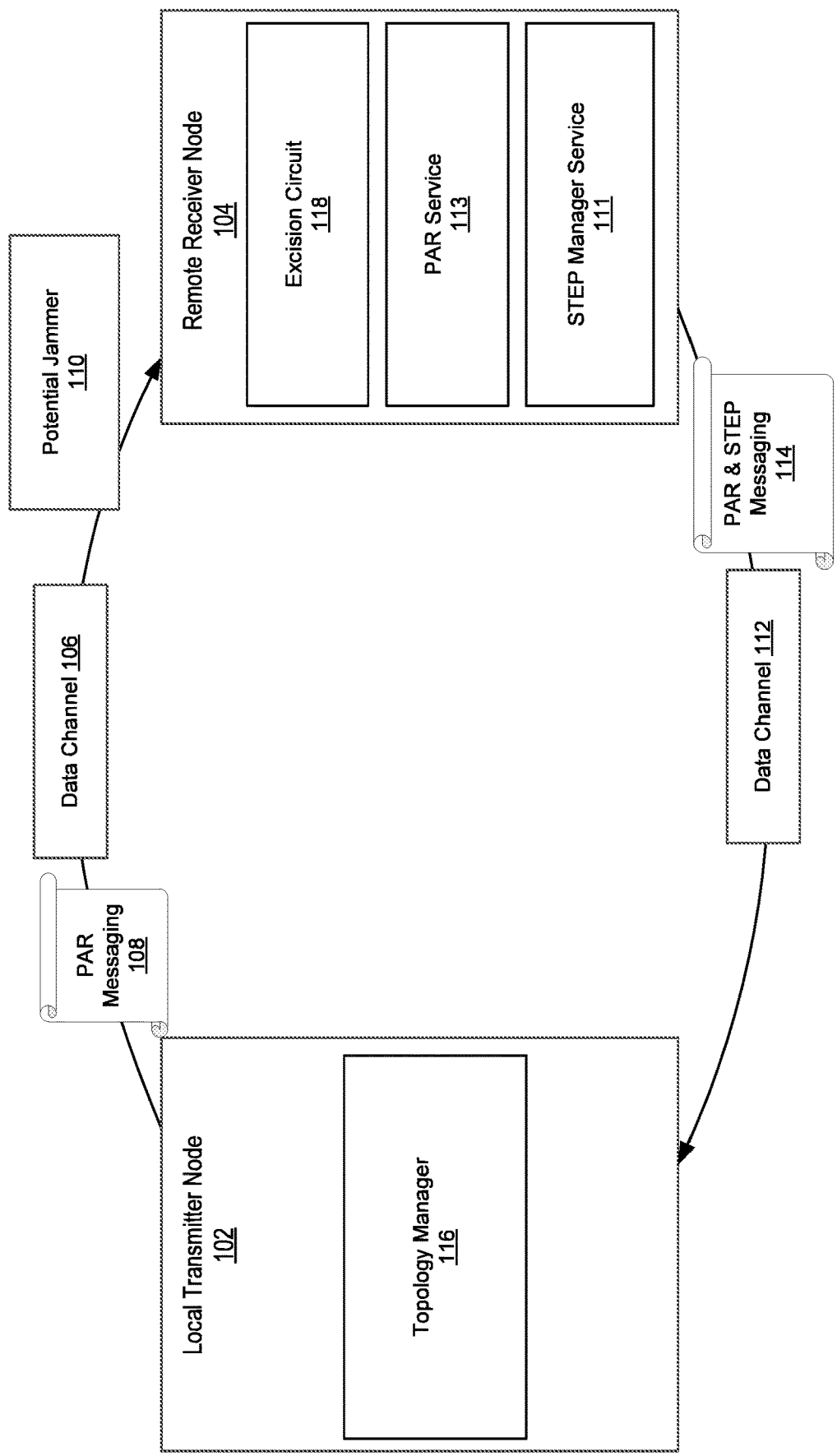
FIG. 1 illustrates a local transmitter node communicating with a remote receiver node over a data channel.

Embodiments illustrated herein can improve system performance by detecting whether or not abrupt jamming is occurring. When abrupt jamming is occurring, a receiver-side signal-to-noise ratio measurement will be inaccurate, and thus cannot be used for making adjustments in power and rate at the local transmitter node. Instead, a receiver side signal-to-noise ratio estimation can be created based on previous measurements, paired with the new spectral information containing interference. Further, the remote receiver node will send spectrum estimates correlated with the signal-to-noise ratio estimate provided to the local transmitter node.

In particular, embodiments can use and adjust pre-jamming interference signal-to-noise ratio (reference signal-to-noise ratio) based on the updated spectrum measurements taken when jamming is occurring. In particular, the local transmitter node will estimate signal-to-noise ratio for signals received at the remote receiver node using the information received from the remote receiver node. In some embodiments, the signal-to-noise ratio may be versus frequency. Counteractive measures will then be performed based on the estimated signal-to-noise ratio, along with the spectrum information. For example, the transmitter node can increase signal-to-noise ratio by transmitting subsequent signals at a higher power and/or a lower rate. Alternatively, the transmitter node can transmit on a different center frequency or band.

In particular, logic is implemented to perform a remote receiver side signal-to-noise ratio prediction calculation and a comparison. The total received power in the signal bandwidth is logged with each signal-to-noise ratio, assuming that it is a consistent value. To check if the value is consistent, the signal-to-noise ratio is predicted, at the remote receiver, based on the new power, rate, and received total power. If the measured value is greater than the predicted value, minus some predetermined margin, then it is assumed to be consistent, meaning that no jamming is occurring.

Otherwise, a determination is made that jamming is occurring, and the previous consistent signal-to-noise ratio value is adjusted to an estimate based on the new interference level. This adjusted signal-to-noise ratio value is then provided to the local transmitter node by the remote receiver node as the signal-to-noise ratio value detected by the remote receiver node.

In some embodiments, automatic gain control (AGC) information is also taken into account to improve the stability of the conditional check. Note that the signal-to-noise ratio adjustment may result in a negative signal-to-noise ratio value.

The abrupt interference mitigation is a novel means of providing consistent signal-to-noise ratio feedback for a frequency-agile radio with spectral sensing.

The receiver-side predictor-comparator operation described below allows the estimates/measurements for power control and frequency agility—signal-to-noise ratio and total spectral power—to be consistent.

Typically, signal-to-noise ratio and total spectral power estimates and/or measurements are made asynchronously by completely different circuits. Without a solution, such as the one described herein, there is a high likelihood of operating on inconsistent values when presented with abrupt interference.

Furthermore, embodiments illustrated herein can be configured to accurately classify and react to link loss due to spectral interference and while also being able to exclude reactions in the same way to link loss due to other situations (such as link loss due to fading, wing shadowing, blockages, etc.). That is, the appropriate corrections needed for link loss due to spectral interference (e.g., jamming) may be different than the correction needed for link loss due to other factors. Embodiments herein are able to differentiate between the two types of link loss and respond accordingly.

Referring now to FIG. 1, an example is illustrated. FIG. 1 illustrates an environment including a local transmitter node 102 and a remote receiver node 104. Note that while only a single local transmitter node 102 and a single remote receiver node 104 are illustrated, it should be appreciated that in many embodiments, multiple nodes will be implemented together with each node acting at various times as a receiver node and/or a transmitter node. As illustrated in FIG. 1, the local transmitter node 102 transmits data to the remote receiver node 104 through the data channel 106. The data transmitted through the data channel 106 will be transmitted at a particular power and rate depending on a target signal-to-noise ratio. The local transmitter node 102 can attempt to increase the signal-to-noise ratio experienced by the remote receiver node 104 by increasing the power of data transmissions on the data channel 106 and/or decreasing the rate of the data on the data channel 106. Similarly, if the local node 102 wishes to lower the signal-to-noise ratio for the remote receiver node 104, this can be accomplished by lowering the power and/or raising the data rate of data transmitted on the data channel 106. For example, in some embodiments, it may be desirable to limit the power being used to transmit data on the data channel 106 to prevent detection, interception, or geolocation of signals sent by the local transmitter node 102. Alternatively, it may be useful to limit power to be power efficient to optimize node performance, reduce amplifier compression, maintain overall signal linearity, etc.

Note that the local transmitter node 102 further transmit power and rate (PAR) messages in the PAR messaging 108 to the remote receiver node 104. The PAR messages PAR messaging 108 correspond to a particular PAR interval. A PAR interval provides an opportunity for the power and/or rate to be changed, thereby adjusting the achieved SNR. In conjunction with this new PAR interval, a new PAR message in the PAR messaging 108 is sent from the local transmitter node 102 to the remote receiver node 104 which allows the remote receiver node 104 to perform various calculations and determinations as will be illustrated in more detail below.

In this example, the local transmitter node's transmission is being jammed at the remote receiver node's receiver by a jammer 110. For example, the jammer 110 may be an adversarial entity attempting to disrupt communications between local transmitter node 102 and the remote receiver node 104. Alternatively, the jammer 110 may simply be unintentional interference, such as interference from other users/terminals, cross-polarization leakage, hardware issues, adjacent satellite interference, co-site interference, electromagnetic radiation, or other interferers that may inadvertently interfere with desired communication.

The remote receiver node 104 is able to evaluate data from the data channel 106 as well as information in the PAR message in the PAR messaging 108 to provide feedback to the local transmitter node 102. In particular, the remote receiver node 104 is continuously processing spectral awareness information, using the STEP algorithm 111 (which may include or be associated with analysis hardware), for one or more receive (Rx) bands and generates a STEP message in messaging 114, transmitted on data channel 112, including Spectral, Temporal, Energy, and Position (STEP) information that it sends to the local transmitter node 102 about the RF environment. Hereinafter, this message is referred to as a STEP message. It may or may not be combined with PAR information. In this description, STEP and PAR are described as separate messages with different information, but they could be combined in one single message. These messages sent back to the local transmitter node 102 are shown together as messaging 114. Note that for the embodiments illustrated herein, the STEP message in messaging 114 only needs to include spectral, temporal, and energy information while position information can be used for other functionality in certain embodiments. Note that this spectral, temporal, and energy information may be computed, for example, by using spectrum analysis hardware that is able to perform Fast Fourier Transforms (FFTs) on the data received through the data channel 106.

FIG. 1 further illustrates that the receiver node 104 sends a return PAR message in messaging 114 to the local transmitter node 102. The return PAR message in messaging 114 includes information gathered about the signal-to-noise ratio detected by a PAR service 113 (which may include or be associated with signal-to-rate measurement hardware) at the remote receiver node 104. This signal-to-noise ratio information can be determined in a number of fashions, such as by determining how easy it is to recover data in the data channel 106. As noted previously, typically the information provided in the return PAR and STEP messages in messaging 114 are derived using different hardware and different derivation techniques. However, for the local transmitter node 102 to make appropriate decisions with respect to frequency agility, it is desirable that the information in the return PAR and STEP messages in messaging 114 can be appropriately correlated. In particular, for accurate decisions to be made at the local transmitter node 102, it may be important to know spectral information that can be correlated with signal-to-noise ratio information.

In particular, the local transmitter node 102 computes potential signal-to-noise vs. frequency and makes decisions as to how to avoid the jamming (transmission agility) via the information correlated in the PAR and STEP messages in messaging 114. The PAR message in messaging 114 contains an indication of the signal-to-noise ratio that the remote receiver node 104 detects in a data stream in the data channel 106 from the local transmitter node 102. The decisions as to how to avoid the jamming are based on local calculations at the local transmitter node 102 within a topology manager service 116. Note that the topology manager service 116 may be implemented at the local transmitter node 102 or at some other appropriate location. Note that while a data channel 106 is illustrated as a traffic channel, it should be appreciated that in other embodiments, this could be a beacon channel, control channel, or combinations thereof as a means to transmit information from node 102 to node 104.

The remote receiver node 104 collects spectral information and populates the STEP message in messaging 114, at the STEP manager service 111, that are sent to the local transmitter node 102. The message includes spectral information representing the ability to see the frequency spectrum within the various receive bands. The STEP message in messaging 114 further includes temporal information representing the ability to see time-domain changes over the spectral information. The STEP message in the messaging 114 further includes energy information used to detect the power within the frequency spectrum over the receive bands. The local transmitter node 102 uses the STEP message in messaging 114 information to compute a predicted signal-to-noise ratio as a function of frequency for all of the receive bands. This process is not described in this algorithm but the predicted signal-to-noise computations vs. frequency are used as an input into center frequency change decisions that can be made at the local transmitter node 102 to avoid interference. Furthermore, this same process can be used at the remote receiver node 104 to compute a jammed signal-to-noise ratio as described later in this detailed description.

While the preceding describes signal-to-noise estimation at the topology manager 116, this process may be modified when abrupt interference occurs in an environment. In particular, a jammer 110 may inject abrupt interference into the environment such that the information in the STEP and the PAR message in messaging 114 is not properly correlated as described previously herein. Thus, some embodiments implement abrupt interference mitigation by causing the PAR service 113 and the STEP manager service 111 to communicate with each other in a fashion that allows for detection of abrupt interference and modification of feedback provided in the STEP and/or the PAR message in messaging 114.

The following variables are used for abrupt interference mitigation calculations:

$FFT_{curr,i}$: FFT spectrum corresponding to the current power measurement $FFT_{prev,i}$: FFT spectrum corresponding to the previous power measurement $i_{start}$: Starting index for the signal of interest $i_{stop}$: Stop index for the signal of interest $P_{in,curr}$: Total power of the current FFT bins occupied by the signal of interest $P_{in,prev}$: Total power of the previous FFT bins occupied by the signal of interest $P_{Tx,ChCurr}$: Current commanded channel power $P_{Tx,ChPrev}$: Previous commanded channel power $STPR_{Measured,dB}$: Calculated STPR based on no jamming occurring. This calculation uses the measured SNR and excision metrics by the remote receiver node 104.

$STPR_{Jammed,dB}$: Predicted STPR value if jamming is occurring $STPR_{prev}$: Previously stored STPR value, which gets set to the $STPR_{Measured,dB}$ value prior to the next STEP algorithm iteration.

$\delta_{dB}$: Jamming threshold

The core of the solution is the proper reporting of the signal-to-noise ratio in the presence of significant jamming. To achieve this, the STEP manager service 111 relies upon the last signal-to-noise ratio measurement and its associated spectrum to update the STPR calculation relative to the new spectrum. To estimate the signal-to-noise ratio value accurately, the PAR service 113 and STEP manager service 111 work closely together. The interaction between the two services is shown in FIG. 3.

Abrupt interference can cause a number of problems with the conventional way of harvesting and reporting signal-to-noise ratio feedback using the data channel 106. For example, if the interference is significant enough to cause a link loss, no signal-to-noise ratio values will be measured. Prior to the solution illustrated herein, the previous convention was to send the most recent signal-to-noise ratio measurement until enough PAR messages (such as PAR message in messaging 114) sent to the local transmitter node 102 were missed to time out the link. This is problematic when paired with a spectrum reflecting a large amount of interference at the center frequency of the data channel 106. In such a case, the predicted signal-to-noise ratio calculation would reflect the outdated signal-to-noise ratio value at the current center frequency and a much higher signal-to-noise ratio at frequencies that did not have as much interference. Embodiments address this issue by predicting the current signal-to-noise ratio value based on the spectral changes instead of using an incorrect signal-to-noise ratio measurement.

Figure 2:
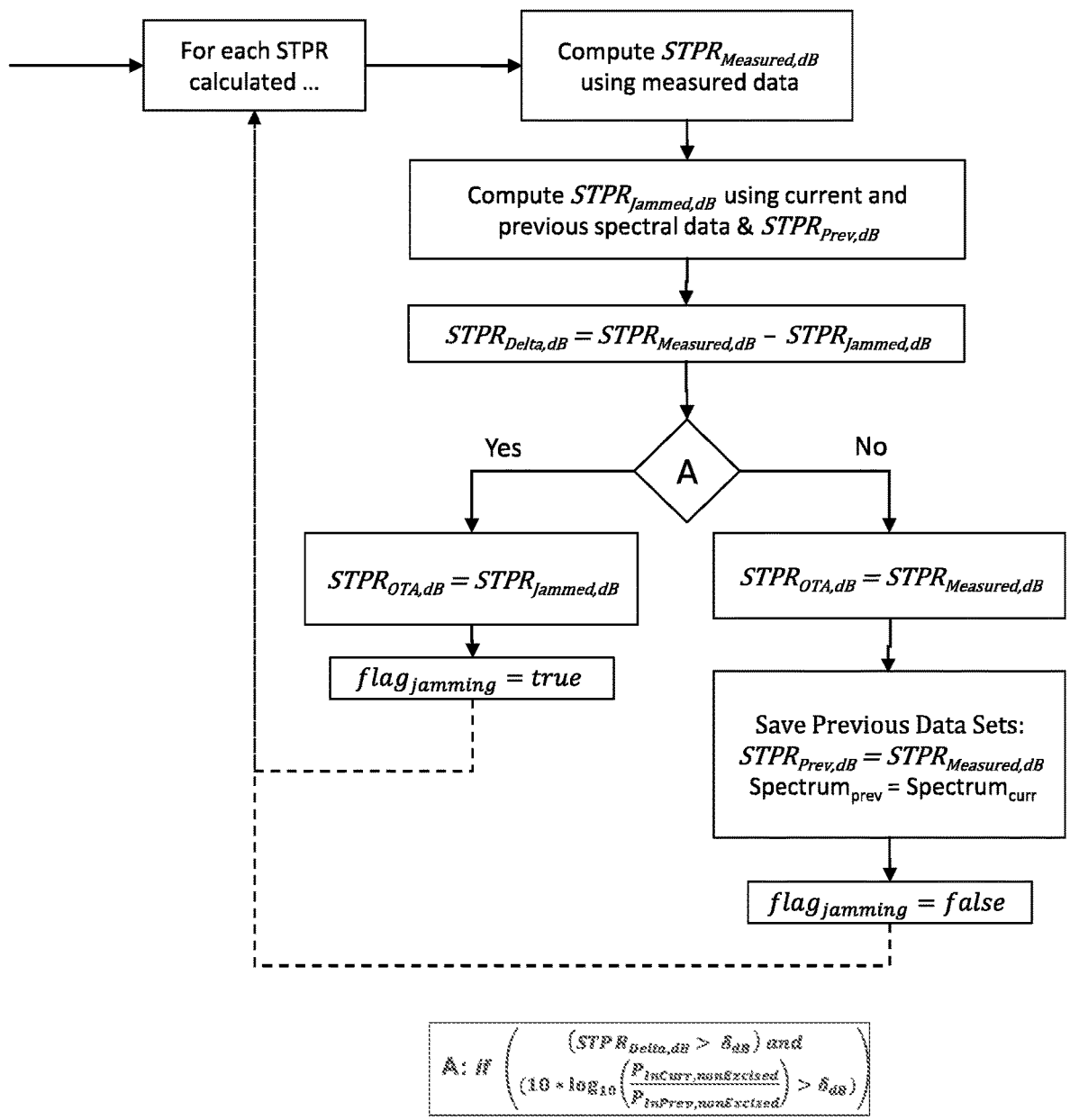
FIG. 2 illustrates a process for determining if abrupt jamming is occurring based on a comparison of signal-to-total-power ratios using both an assumption that jamming is not occurring and an assumption that jamming is now occurring.
Figure 3:
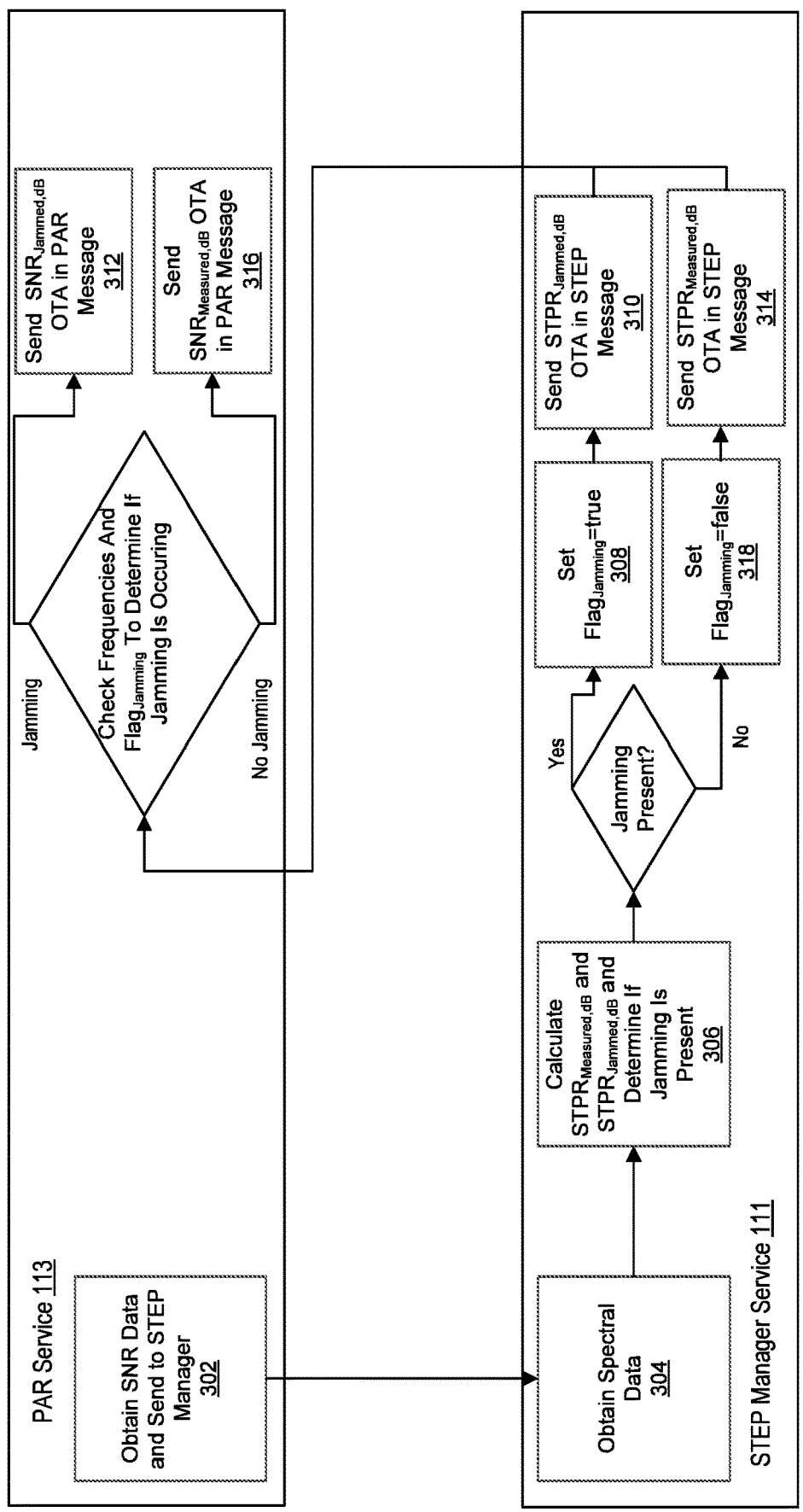
FIG. 3 illustrates interaction between a power and rate service and a STEP manager service at the remote receiver node.

Referring now to FIG. 3, at the beginning of each PAR interval, the PAR service 113 requests signal-to-noise ratio data from radio hardware (see 302). The signal-to-noise ratio selected by the PAR service 113 is sent to the STEP manager service 111. At that point, the STEP manager service 111 obtains the latest spectral data to use for the rest of the calculations (see 306 and FIG. 2) associated with the current PAR interval (see 304). In some embodiments, this information may be obtained from the excision circuit or other similar circuitry. In particular, the excision circuit 118 may include various hardware such as FFT hardware that is able to determine spectral information including frequency and power of signals received on the data channel 106. In particular, this is often performed as part of the process of identifying interferers in the signal transmitted on the data channel 106. For example, the excision circuit 118 may be able to identify particularly strong frequency components which are often indicative of interference in the signal transmitted on the data channel 106. The excision circuit 118 can then attempt to excise this interference. As a byproduct of these operations, various frequency bins are identified, and spectral information is identified related to the signal in the data channel 106. This identified information can be used by the STEP manager service 111 as described herein.

The signal-to-noise ratio is used by the STEP manager service 111 to compute the measured STPR value ($STPR_{Measured,dB}$) and then compare it with the jammed STPR calculation ($STPR_{Jammed,dB}$) Details of the conversion and comparison are illustrated in FIG. 2. In the event that the most recent available spectrum has a significant amount of additional power (presumably from interferers injecting additional power into the spectrum) and the STPR computations do not closely match (see condition A in FIG. 2), then the STEP manager service 111 will flag a jamming event by setting $flag_{jamming}$ as illustrated in FIG. 2 (see also 308 in FIG. 3). If a jamming event is detected, then PAR service 113 will calculate a new signal-to-noise ratio estimate based on the predicted STPR (i.e., $STPR_{Jammed,dB}$ illustrated in FIG. 2). This could result in a negative signal-to-noise ratio, so in some embodiments, the PAR message format may include a sign bit.

The process to calculate the STPR is diagramed in FIG. 2. The STEP manager service 111 performs the standard calculation to obtain $STPR_{Measured,dB}$ using the statistics from the excision circuit 118 and the measured signal-to-noise ratio, $\rho$. The excision circuit provides two important values: $P_{exc\_delta}$ and $R_{mask}$. The $P_{exc\_delta}$ value describes the power ratio between the excision circuit output and the excision circuit input. The mask ratio value, $R_{mask}$, describes the ratio of the number of bins that are not excised to the total number of bins in the signal passband. These excision metrics are stored as part of the previous data set information shown in the diagram of FIG. 2 and used in the calculations described below. The STEP manager service 111 also computes $STPR_{Jammed,dB}$ using the current spectrum and the previously stored values (including previous spectrum). The spectral power is summed over the bandwidth of the desired channel for both the previous spectrum and the current spectrum to produce the following intermediate values:

$$P_{in,prev} = \sum_{i=i\_start}^{i\_stop} FFT_{prev,i}$$

$$P_{in,curr} = \sum_{i=i\_start}^{i\_stop} FFT_{curr,i}$$

Since STPR is the ratio of signal power to the total power, the predicted STPR if jamming is occurring is calculated as follows:

$$STPR_{Jammed,dB} = 10 * \log_{10}\left(\frac{STPR_{Prev} * P_{inPrev} * P_{TxChCurr}}{P_{inCurr} * P_{TxChPrev}}\right)$$

The STPR if no jamming is occurring is calculated as follows:

$$STPR_{Measured,db} = 10 * \log_{10}\left(\frac{\frac{P_{exc\_delta}}{R_{mask}} * \rho}{\frac{R_c}{R_b} + \rho}\right)$$

$$STPR_{DeltadB} = STPR_{Measured,dB} - STPR_{Jammed,dB}$$

After calculating the predicted STPR if jamming is occurring, the following conditions must both be true in order to declare a jammed state:

$$(STPR_{Delta,dB} > \delta_{dB})$$

and $$10 * \log_{10}\left(\frac{P_{InCurr,nonExcised}}{P_{InPrev,nonExcised}}\right) > \delta_{dB}$$

Where:

$$P_{InCurr,nonExcised} = \frac{P_{exc_{delta,curr}}}{R_{mask,curr}} \sum_{i=0}^{i=N-1} FFT_{curr,i}$$

$$P_{InPrev,nonExcised} = \frac{P_{exc_{delta,prev}}}{R_{mask,prev}} \sum_{i=0}^{i=N-1} FFT_{prev,i}$$

where $\delta_{dB}$ is a value greater than 0 dB. The first condition ($STPR_{Delta,dB} > \delta_{dB}$)) identifies a case where the calculated value is considerably higher than the predicted value, which could result from using a signal-to-noise ratio that does not match the most recent spectral measurements. The second condition $$\left(10 * \log_{10}\left(\frac{P_{InCurr,nonExcised}}{P_{InPrev,nonExcised}}\right) > \delta_{dB}\right)$$

deserves some additional explanation. By multiplying $P_{exc\_delta}$ by $P_{total}$, embodiments calculate the power after excision. When that product is divided by $R_{mask}$, the power after excision is normalized to the full signal bandwidth. The purpose of this condition is to check whether the change in power is due to interference that cannot be excised. If so, the $\delta_{dB}$ value is expected to be at least larger than the pre-defined threshold, and thus jamming will be detected.

If both conditions are true, then the $STPR_{Jammed,dB}$ value is sent (see 310) as the STPR value in the STEP message 114 and the jamming flag is set to true. In addition, the PAR service 113 reports a signal-to-noise ratio calculated from $STPR_{Jammed,dB}$ along with the power, rate, and a sequence number associated with the previous data (see 312). The sequence number allows data to be tracked at the topology manager 116 with respect to power and rate at which data was sent by the local transmitter node 102 compared to signal-to-noise ratio of the same data received by the remote receiver node 104. If either of the conditions are not met, the $STPR_{Measured,dB}$ value is used as the STPR value in the STEP message 114 (see 314), the jamming flag is set to false (318), and the previous data is updated with the current data. The previous data that is saved may include, for example, FFT data (e.g., spectrum and power data), STPR, signal-to-noise ratio data, excision performance information, chip rate and/or data rate, transmission power, transmission rate, and a sequence number. The PAR algorithm 113 does not make any changes to the data in the PAR message in messaging 114 such that a measured signal-to-noise ratio value is sent OTA in the PAR message in messaging 114 (see 316).

If the jamming flag is marked true and the center frequencies are consistent, then the PAR service 113 requests that a predicted signal-to-noise ratio be scaled based on $STPR_{Jammed,dB}$ This call uses the same logic that is used by the topology manager 116 to calculate predicted signal-to-noise ratio after the OTA STEP message is received (i.e., local transmitter node processing). However, the logic can be streamlined for the PAR service 113, since it only needs the predicted signal-to-noise ratio at a single center frequency. The above process occurs at the beginning of each PAR interval when the PAR message in messaging 114 is constructed.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
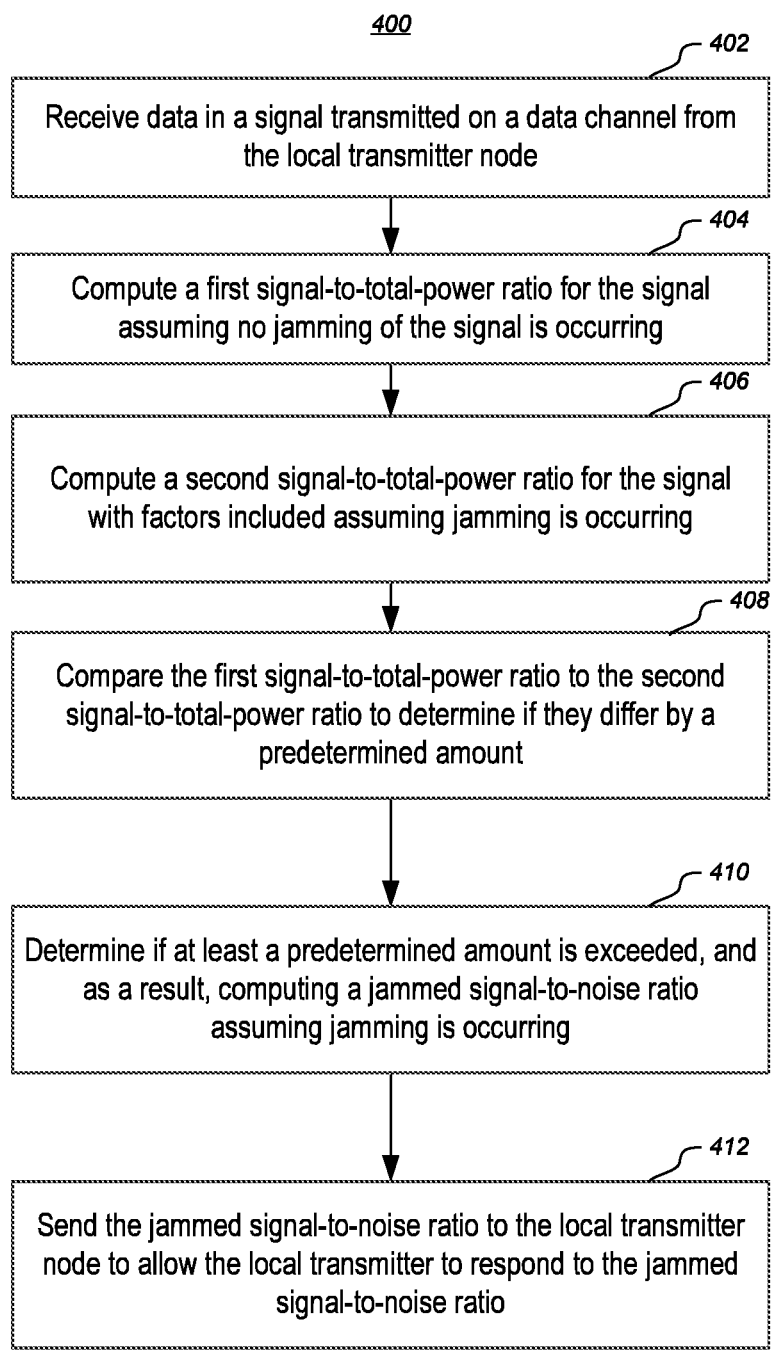
FIG. 4 illustrates a method of providing signal-to-noise ratio information to the local transmitter node.

Referring now to FIG. 4, a method 400 is illustrated. The method 400 may be practiced at a remote receiver node in a network. The method includes acts for providing signal-to-noise ratio information to a local transmitter node. The method includes receiving data in a signal transmitted on a data channel from the local transmitter node (act 402).

The method 400 further includes computing a first signal-to-total-power ratio for the signal assuming no jamming of the signal is occurring (act 404).

The method 400 further includes computing a second signal-to-total-power ratio for the signal with factors included assuming jamming is occurring (act 406).

The method 400 further includes comparing the first signal-to-total-power ratio to the second signal-to-total-power ratio to determine if they differ by at least a predetermined amount (act 408). In some embodiments, the predetermined amount may be multifactorial. For example, FIG. 2 illustrates condition 'A' where a plurality of comparisons is made.

The method 400 further includes determining that the predetermined amount is exceeded, and as a result, computing a jammed signal-to-noise ratio assuming jamming is occurring (act 410).

The method 400 further includes sending the jammed signal-to-noise ratio to the local transmitter node to allow the local transmitter to respond to the jammed signal-to-noise ratio (act 412).

The method 400 may further include receiving other data on the data channel at an increased power as a result of the local transmitter node responding to the jammed signal-to-noise ratio. That is, embodiments may cause a transmitter node to increase power to compensate for the jamming.

The method 400 may further include receiving other data on the data channel at a decreased data rate as a result of the local transmitter node responding to the jammed signal-to-noise ratio. That is, embodiments may cause a transmitter node to decrease the rate at which data is sent to compensate for the jamming.

The method 400 may further include receiving other data on the data channel at a different center frequency as a result of the local transmitter node responding to the jammed signal-to-noise ratio. That is, embodiments may cause a transmitter node to change center frequency to avoid the jamming.

The method 400 may be practiced where the jammed signal-to-noise ratio comprises scaling a measured signal-to-noise ratio by a scale factor that is a function of the first signal-to-total-power ratio to the second signal-to-total-power ratio.

The method 400 may be practiced where computing the second signal-to-total-power ratio for the signal with factors included, assuming jamming is occurring, comprises using a power estimate of a jammer within the signal bandwidth. For example, as illustrated above, this can be obtained by the computation of $P_{in,curr}$ illustrated above.

The method 400 may further include using excision circuit output parameters to compute spectrum and power information for removing interference from the signal and using the computed spectrum and power information in computing at least one of the first signal-to-total-power ratio or the second signal-to-total-power ratio.

The method 400 may be practiced where computing the second signal-to-total-power ratio for the signal with factors included, assuming jamming is occurring, is performed in a fashion that differentiates interference from jamming as opposed to interference from other sources. Using the methods described above allows interference from jamming to be distinguished from signal loss due to fading, wing shadowing, blockages, etc.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a remote receiver node in a network, a method of providing signal-to-noise ratio information to a local transmitter node, the method comprising:
   receiving data in a signal transmitted on a data channel from the local transmitter node;
   computing a first signal-to-total-power ratio for the signal assuming no jamming of the signal is occurring;
   computing a second signal-to-total-power ratio for the signal with factors included, assuming jamming is occurring;
   comparing the first signal-to-total-power ratio to the second signal-to-total-power ratio to determine if they differ by at least a predetermined amount;

determining that the predetermined amount is exceeded, and as a result, computing a jammed signal-to-noise ratio assuming jamming is occurring; and sending the jammed signal-to-noise ratio in place of a current calculated signal-to-noise ratio to the local transmitter node to allow the local transmitter to respond to the jammed signal-to-noise ratio.

2. The method of claim 1, further comprising receiving other data on the data channel at an increased power as a result of the local transmitter node responding to the jammed signal-to-noise ratio.

3. The method of claim 1, further comprising receiving other data on the data channel at a decreased data rate as a result of the local transmitter node responding to the jammed signal-to-noise ratio.

4. The method of claim 1, further comprising receiving other data on the data channel at a different center frequency as a result of the local transmitter node responding to the jammed signal-to-noise ratio.

5. The method of claim 1, wherein computing the jammed signal-to-noise ratio comprises scaling a measured signal-to-noise ratio by a scale factor that is a function of the first signal-to-total-power ratio and the second signal-to-total-power ratio.

6. The method of claim 1, wherein computing the second signal-to-total-power ratio for the signal with factors included, assuming jamming is occurring, comprises using a power estimate of a jammer within the signal bandwidth.

7. The method of claim 1, further comprising using excision circuit output parameters to compute spectrum and power information for removing interference from the signal and using the computed spectrum and power information in computing at least one of the first signal-to-total-power ratio or the second signal-to-total-power ratio.

8. The method of claim 1, wherein computing the second signal-to-total-power ratio for the signal with factors included, assuming jamming is occurring, is performed in a fashion that differentiates interference from jamming as opposed to other signal losses.

9. A receiver node in a network, the receiver node comprising:
wireless hardware configured to receive data in a signal transmitted on a data channel from a local transmitter node;
a Spectral Temporal Energy Position (STEP) manager service coupled to the wireless hardware, the STEP manager service configured to:
compute a first signal-to-total-power ratio for the signal assuming no jamming of the signal is occurring;
compute a second signal-to-total-power ratio for the signal with factors included, assuming jamming is occurring; and
compare the first signal-to-total-power ratio to the second signal-to-total-power ratio to determine if they differ by at least a predetermined amount;
a Power And Rate service coupled to the STEP manager service configured to, as a result of determining that the predetermined amount is exceeded, compute a jammed signal-to-noise ratio assuming jamming is occurring; and
wherein the wireless hardware is configured to send the jammed signal-to-noise ratio instead of the current calculated signal-to-noise ratio to the local transmitter node to allow the local transmitter to respond to the jammed signal-to-noise ratio.

10. The receiver node of claim 9, wherein the wireless hardware is configured to receive other data on the data channel at an increased power as a result of the local transmitter node responding to the jammed signal-to-noise ratio.

11. The receiver node of claim 9, wherein the wireless hardware is configured to receive other data on the data channel at a decreased data rate as a result of the local transmitter node responding to the jammed signal-to-noise ratio.

12. The receiver node of claim 9, wherein the wireless hardware is configured to receive other data on the data channel at a different channel center frequency as a result of the local transmitter node responding to the jammed signal-to-noise ratio.

13. The receiver node of claim 9, wherein computing the jammed signal-to-noise ratio comprises scaling a measured signal-to-noise ratio by a scale factor that is a function of the first signal-to-total-power ratio and the second signal-to-total-power ratio.

14. The receiver node of claim 9, wherein computing the second signal-to-total-power ratio for the signal with factors included assuming jamming is occurring comprises using a power estimate of a jammer within the signal bandwidth.

15. The receiver node of claim 9, further comprising using excision circuit output parameters to compute spectrum and power information for removing interference from the signal, and wherein the computed spectrum and power information in computing at least one of the first signal-to-total-power ratio or the second signal-to-total-power ratio.

16. The receiver node of claim 9, wherein computing the second signal-to-total-power ratio for the signal with factors included assuming jamming is occurring is performed in a fashion that differentiates interference from jamming as opposed to interference from other sources.

17. A computer system comprising:
one or more processors; and
one or more computer-readable media having stored thereon instructions that are executable by the one or more processors to configure the computer system to provide signal-to-noise ratio information to a local transmitter node, including instructions that are executable to configure the computer system to perform at least the following:
receiving data in a signal transmitted on a data channel from the local transmitter node;
computing a first signal-to-total-power ratio for the signal assuming no jamming of the signal is occurring;
computing a second signal-to-total-power ratio for the signal with factors included assuming jamming is occurring;
comparing the first signal-to-total-power ratio to the second signal-to-total-power ratio to determine if they differ by at least a predetermined amount;
determining that the predetermined amount is exceeded, and as a result, computing a jammed signal-to-noise ratio assuming jamming is occurring; and
sending the jammed signal-to-noise ratio instead of the current calculated signal-to-noise ratio to the local transmitter node to allow the local transmitter to respond to the jammed signal-to-noise ratio.

18. The computer system of claim 17, wherein computing the jammed signal-to-noise ratio comprises scaling a measured signal-to-noise ratio by a scale factor that is a function of the first signal-to-total-power ratio and the second signal-to-total-power ratio.

19. The computer system of claim 17, wherein the one or more computer-readable media have stored thereon instructions that are executable by the one or more processors to configure the computer system to further use excision circuit output parameters to compute spectrum and power information for removing interference from the signal and using the computed spectrum and power information in computing at least one of the first signal-to-total-power ratio or the second signal-to-total-power ratio.

20. The computer system of claim 17, wherein computing the second signal-to-total-power ratio for the signal with factors included, assuming jamming is occurring, is performed in a fashion that differentiates interference from jamming as opposed to other signal losses.

* * * * *